Feb. 11, 1947.    E. J. MARTIN ET AL    2,415,513
TORQUE MEASURING DEVICE
Original Filed March 7, 1942

Inventors
Edward J. Martin
Carl E. Grinstead &
Robert N. Frawley
By Blackmor, Spencer & Flint
Attorneys Patented Feb. 11, 1947

2,415,513

UNITED STATES PATENT OFFICE 2,415,513

TORQUE MEASURING DEVICE

Edward J. Martin, Pleasant Ridge, Mich., Robert N. Frawley, Phoenix, Ariz., and Carl E. Grinstead, Detroit, Mich., assignors to General Motors Corporation, Detroit, Mich., a corporation of Delaware Original application March 7, 1942, Serial No. 433,820. Divided and this application May 13, 1943, Serial No. 486,822

3 Claims. (Cl. 73—136)

This invention relates to measuring apparatus and more specifically to means for measuring quantities of rotating force such as torque or angular acceleration and is a division of application Serial No. 433,820, entitled "Transformer" and filed March 7, 1942, in the names of Martin, Grinstead and Frawley. In many instances it is of course necessary to measure various characteristics of rotatable means and to use changes in inductance or capacity of certain parts to determine torque, etc. However, in these instances it is necessary to transfer or conduct changes in the electrical quantities so altered or changed in the rotating parts themselves to some stationary measuring apparatus. It has been common practice to transfer electrical currents from rotating means to stationary apparatus by slip rings or commutators, but in many instances where the values of the current transferred are very small and of necessity the variation in these currents is also minute, the resistance caused by the slip rings or commutators, both frictional and electrical, is so large and variable as to cause errors in the readings which will make the latter unsatisfactory.

It is therefore an object of our invention to provide means for transferring from rotatable apparatus to stationary measuring apparatus quantities of electrical energy representative of different characteristics of the rotating means without direct conductive paths.

It is a further object of our invention to provide electrical coupling means between rotatable and stationary apparatus which will not introduce any mechanical friction between the two or any electrical resistance in the coupling.

It is a still further object of our invention to provide means whose electrical characteristics will be altered by a change in the physical characteristic of a piece under inspection.

With these and other objects in view, which will become apparent as the specification proceeds, the embodiments of our invention will be best understood by reference to the following specification and claims and the illustrations in the accompanying drawing, in which:

Figure 1:
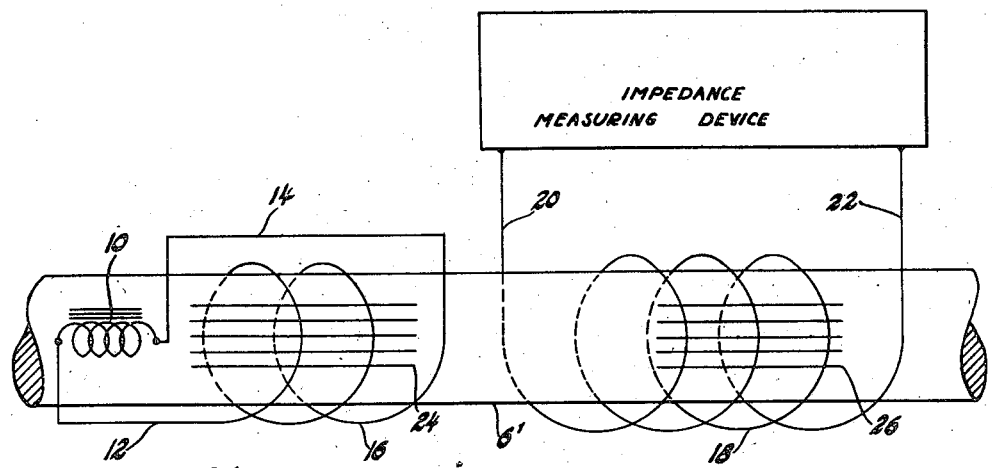
Figure 1 is a schematic diagram showing an electrical circuit embodying our invention.

Referring now more specifically to the drawing, there is shown in Figure 1 a variable impedance 10 which is mounted in means to be described in the rotatable member such as the shaft 6'. This impedance is connected by lines 12 and 14 to a transformer primary or inductance coil 16 which is mounted directly upon the rotatable shaft and has its axis coincident with the axis of the shaft. The transformer secondary 18 is mounted directly over the primary and also has its axis coincident with the axis of the shaft and has its terminals 20 and 22 connected to an impedance bridge or other measuring device. Thus, 18 and 16 are wound concentric with the axis of rotation of the shaft and the mutual coupling remains constant for all angles of rotation.

If, therefore, the device is so arranged that changes in the desired characteristics such as torque vary the impedance of the member 10, this change in impedance will be transferred through the transformer 16—18 and indicated by a change in the A. C. bridge or other measuring device. In some instances it may be necessary to increase the magnetic field and decrease any eddy current loss of the transformer and this may be done by having an electrical insulating section in the shaft which may be filled with laminated members to provide the usual transformer core. These are shown diagrammatically at 24. It may also be desirable to provide core members for the secondary and this will be described more in detail at a later point and these members are shown as laminations at 26.

Figure 2:
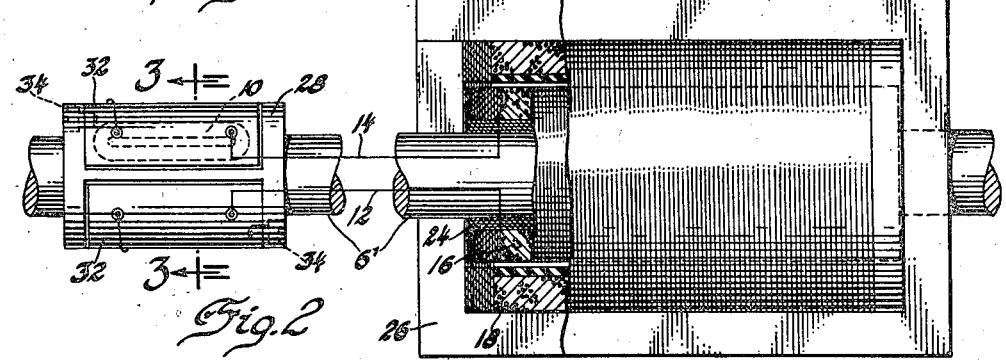
Figure 2 is a view showing the location of the various pick-up coils and transformer used in the system illustrated in Figure 1.
Figures 3, 4:
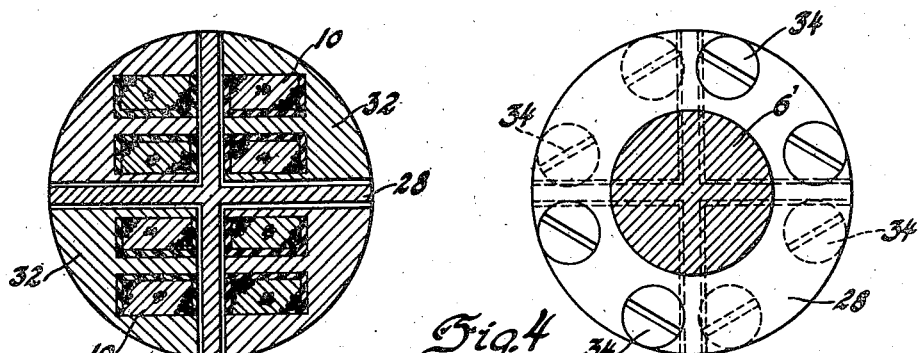
Figure 3 is a sectional view taken on line 3—3 of Figure 2.
Figure 4 is an end view of the exploring coil assembly of Figure 2.

The actual apparatus utilized for this form of our invention is shown more in detail in Figures 2, 3 and 4 and in this instance the shaft 6' is shown as carrying a member whose impedance characteristics may be altered by the values of torque applied to the shaft. To the shaft 6' is applied an exploring piece 28 whose two ends are in the nature of flanges which are interconnected by two intersecting flat plates giving the cross section of the intermediate portion the form of a right angle cross. This provides four quarters into which may be inserted test coils 10 which are imbedded in arcuate quarters 32 of magnetic material and inserted into the sections of the exploring member. These coils are electrically connected in series. The arcuate members are supported in the exploring member by suitable stud bolts 34 which are passed through the end flanges into the ends of the arcuate members to support them therein. It will be evident from the drawing that alternate coils are supported at opposite ends, thus the two diametrically opposite coils are supported from the same end plate when four coils are used. This will cause the distance between coils to be altered upon a variation in torque applied to the shaft.

The two leads 12 and 14 which extend from the coils, which as before mentioned are all connected electrically in series, are led down the shaft and are connected to the rotating transformer coil 16 which is shown mounted upon the shaft as previously described and has its axis coincident with that of the shaft. There are also shown in this figure a series of laminations 24 to act as a core for the primary coil 16. These laminations are only illustrative of one of many ways of inserting the same. A section of the shaft may be removed and insulating material inserted to carry the laminations, if desired. Mounted on any suitable stationary means and concentric with the rotating coil is the secondary coil 18 which has associated therewith certain laminated portions 26 which act as a core for this portion of the transformer.

It will thus be evident that as the torque on the shaft varies, the impedance of the coils 10 carried in the insulated quadrant sectors will vary and thus the amount of energy transferred from the primary 16 to the secondary 18 will vary and an indication will be obtained on suitable indicating apparatus.

We claim:

1. In measuring means, a rotatable support comprising a pair of circular end plates and intersecting flat plates connecting them, thus providing a plurality of arcuate chambers, exploring coils mounted in each of the chambers, alternate coils being secured to the same end plate whereby rotational force will alter the distance between adjacent coils and therefore their impedance for indication.

2. In measuring means applicable to a rotatable member whose physical characteristics it is desired to measure, a support having a substantially cylindrical outline rigidly connected thereto at its ends, said support having arcuate sector openings in the periphery, coils located in these openings, adjacent coils being secured at one end to opposite ends of the support whereby as torque is applied to the member and therefore to the support there will be relative movement between the coils and a change of impedance, all of the coils being electrically connected in series, a transformer primary also carried by the rotating member and connected to the coils and a stationary transformer secondary concentric with the primary in energy transferring relation therewith.

3. In a device for measuring the torque applied to a rotating member, including, a rotatable support comprising a pair of circular end plates and intersecting flat plates connecting them, thus providing a plurality of arcuate chambers, exploring coils mounted in each of the chambers and electrically connected to each other, alternate coils being secured to the same end plate whereby torque applied to the rotatable member will alter the distance between adjacent coils and therefore their impedance for indication, a transformer coil connected in series with the exploring coils and mounted on the rotating member and a second transformer coil held stationary and inductively coupled thereto to effect transfer of energy between the two transformer coils.

EDWARD J. MARTIN.
ROBT. N. FRAWLEY.
CARL E. GRINSTEAD.

REFERENCES CITED

The following references are of record in the file of this patent:

UNITED STATES PATENTS

| Number | Name | Date |
|---|---|---|
| 979,503 | Johnson | Dec. 27, 1910 |
| 2,313,682 | Stuart | Mar. 9, 1943 |
| 1,938,349 | Norton | May 22, 1924 |
| 2,365,564 | Langer | Dec. 19, 1944 |
| 2,385,005 | Langer | Sept. 18, 1945 |

FOREIGN PATENTS

| Number | Country | Date |
|---|---|---|
| 215,986 | British | May 22, 1924 |
| 470,454 | German | Jan. 15, 1929 |
| 423,706 | British | Feb. 6, 1935 |